Figure 1:
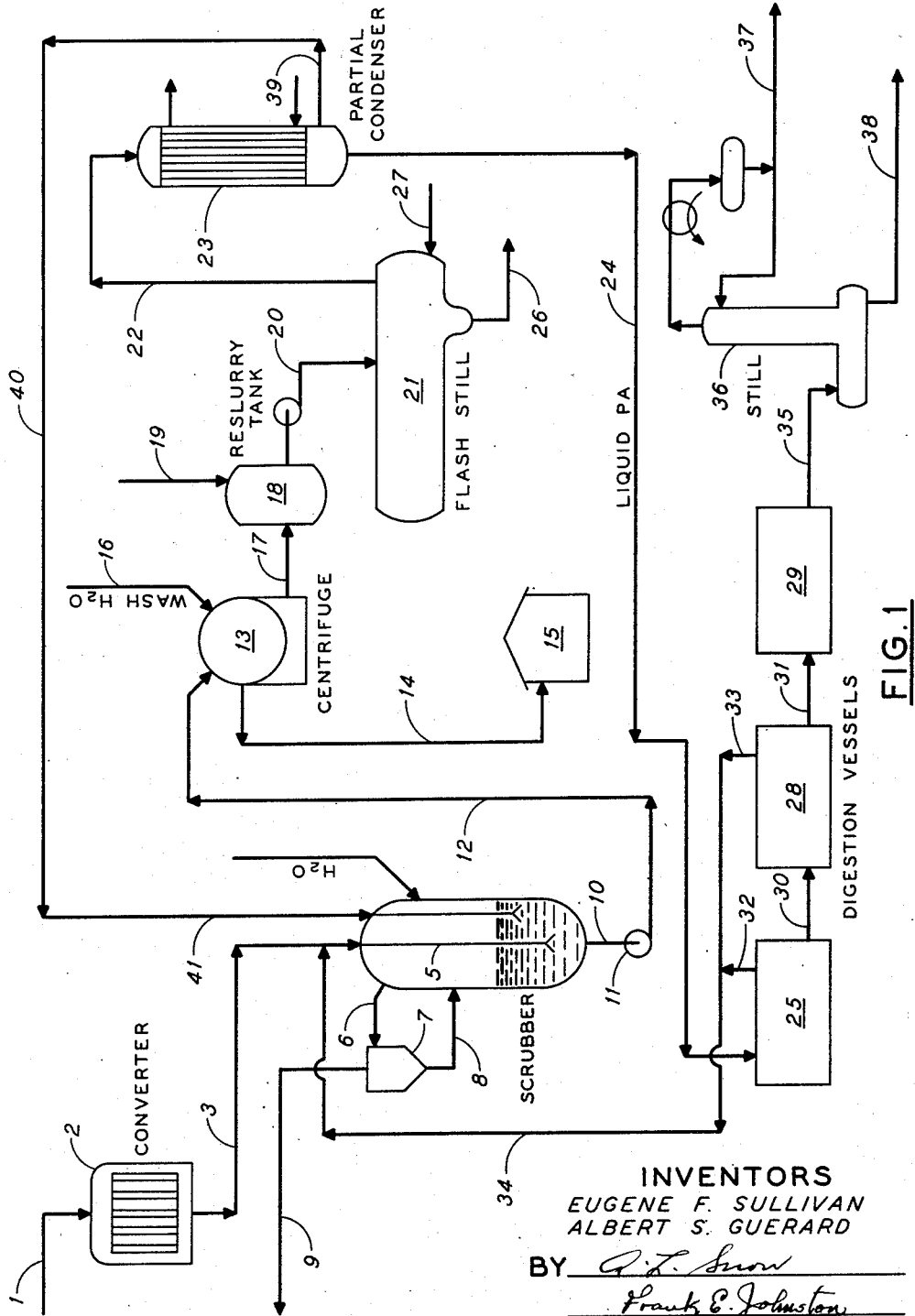

March 26, 1957 E. F. SULLIVAN ET AL 2,786,805
PROCESS OF PURIFICATION OF PHTHALIC ANHYDRIDE
Filed March 1, 1954 3 Sheets-Sheet 1

INVENTORS
EUGENE F. SULLIVAN
ALBERT S. GUERARD
BY
ATTORNEYS

March 26, 1957 E. F. SULLIVAN ET AL 2,786,805
PROCESS OF PURIFICATION OF PHTHALIC ANHYDRIDE
Filed March 1, 1954 3 Sheets-Sheet 3

INVENTORS
EUGENE F. SULLIVAN
ALBERT S. GUERARD

United States Patent Office 2,786,805
Patented Mar. 26, 1957

2,786,805

PROCESS OF PURIFICATION OF PHTHALIC ANHYDRIDE

Eugene F. Sullivan, El Cerrito, and Albert S. Guerard, Berkeley, Calif.; said Sullivan assignor to California Research Corporation, San Francisco, Calif., a corporation of Delaware Application March 1, 1954, Serial No. 413,208

7 Claims. (Cl. 202—50)

This invention relates to a process for purifying crude phthalic anhydride. More particularly, it relates to a method for recovering phthalic anhydride from the gaseous reaction product mixture produced when a phthalic anhydride convertible hydrocarbon is oxidized to phthalic anhydride with a large stoichiometric excess of air in the presence of a vanadium oxide catalyst, and purifying the recovered phthalic anhydride.

Commercial processes for the production of phthalic anhydride by vapor phase oxidation of phthalic anhydride convertible hydrocarbons such as naphthalenes, phenanthrenes, ortho-dialkyl benzenes, indenes, and the like, are characterized by the employment of high air-hydrocarbon ratios in the air-hydrocarbon mixture introduced into the reactors. The oxidation is accomplished by contacting the hydrocarbon in vapor phase in the presence of a stoichiometric excess of a free oxygen-containing gas with a vanadium oxide catalyst at temperatures in the range from about 600° F. to about 1175° F. In the usual commercial practice reaction temperatures from about 800° F. to 1050° F. are found to be satisfactory. Fifteen to forty parts by weight of air to one part by weight of hydrocarbon are commonly charged to the oxidation reactor. The employment of such high air-hydrocarbon ratios in the process is necessary in order to avoid conditions of composition and temperature which produce explosions in the reactors. Because of the high air-hydrocarbon ratios characterizing the charge to the oxidation reactors, the reaction mixture produced has a low phthalic anhydride content. The content of phthalic anhydride in the reaction product produced in most commercial vapor phase hydrocarbon oxidations is so low that upon cooling the reaction product mixture either all or the greater part of the phthalic anhydride which is condensed from the reaction mixture appears in solid form.

A number of methods have been proposed for recovering phthalic anhydride from the reaction product mixture produced in vapor phase oxidation of phthalic anhydride. Phthalic anhydride has been recovered from such mixtures by passing the reaction product mixture into a large chamber commonly referred to as a "haybarn." As the reaction product mixture cools, the phthalic anhydride crystals condense and settle on the floor of the chamber. Phthalic anhydride is also recovered by passing the reaction mixture through a tubular heat exchanger to effect condensation of solid phthalic anhydride. A cooling liquid is brought into indirect heat exchange with the reaction product causing solid phthalic anhydride to condense in the exchanger. Such exchangers are ordinarily employed in parallel flow so that one exchanger may be on stream to the reaction product mixture, while phthalic anhydride is being removed from the other usually by passing steam through the exchanger to melt the phthalic anhydride which is then removed in liquid form. Phthalic anhydride has also been recovered from commercial reaction product mixtures by subjecting the reaction mixture to water scrubbing which removes the phthalic anhydride from it. The employment of this method results in the production of a slurry of phthalic acid which is filtered to recover solid phthalic acid as the filter cake.

The solid phthalic anhydride recovered by any of the above methods is then subjected to a purification treatment which ordinarily involves two steps: digestion of the whole crude phthalic anhydride at elevated temperature for a period of 24 to about 100 hours, and distillation of the digested crude phthalic anhydride.

Commercial phthalic anhydride finds large scale use in the production of alkyd resins and plasticizers. Purity requirements of phthalic anhydride in these uses are high, with the result that rather rigorous purity specifications have been adopted in the art. Primary specifications are directed to freeze point, initial color and color stability. Commercial phthalic anhydride should have a minimum freeze point of 130.5° C.; it should have an initial color not exceeding 100 on the Hazen scale, and it should have a color retention such that the Hazen color does not exceed 300 after the phthalic anhydride has been held at 250° C. for 1½ hours. In order to meet these specifications following current commercial purification procedures, it has been found necessary to conduct the final distillation of the phthalic anhydride so as to separate the phthalic anhydride charged to the distillation zone into three cuts: a top or heads cut, a heart cut of specification phthalic anhydride, and a bottoms fraction. In order that the heart cut, which is the commercial product, meet the specifications, it is necessary to remove top and bottoms fractions of substantial volume and substantial phthalic anhydride content. These cuts may be subsequently processed for the recovery of additional phthalic anhydride, but this treatment is expensive and, at best, appreciable losses of available phthalic anhydride from the crude reaction product are sustained during the purification.

It is an object of this invention to provide a method for recovering and purifying the phthalic anhydride contained in commercial reaction product mixtures by which specification phthalic anhydride is readily and economically obtained at high yields based on the phthalic anhydride content of the crude reaction product.

Pursuant to the invention, phthalic anhydride is purified by mixing it with sufficient water to form a pumpable slurry, subjecting the slurry to a temperature in the range from about 375° F. to 450° F. in a distillation zone, removing stream and phthalic anhydride vapor overhead from the distillation zone, cooling the overhead vapors to about 300° F. to produce a liquid condensate consisting predominantly of phthalic anhydride and substantially free of water, and fractionally distilling the condensate to recover purified phthalic anhydride overhead.

In a preferred embodiment of the invention, the gaseous reaction product effluent from an oxidation zone in which a phthalic anhydride convertible hydrocarbon is catalytically oxidized to phthalic anhydride employing a large stoichiometric excess of air is contacted with water in a condensation zone to produce a slurry of phthalic acid in water. The slurry is filtered to recover solid phthalic acid as the filter cake. The filter cake is washed with water and is then mixed with sufficient water to form a pumpable slurry preferably containing from about 0.5 to 3.0 parts by weight of water per part of phthalic anhydride, the slurry is rapidly heated to a temperature in the range from about 400° F. to 440° F. to produce a vapor phase consisting essentially of steam and phthalic anhydride. The vapor phase is cooled to about 300° F. to condense liquid phthalic anhydride therefrom and the condensed phthalic anhydride is fractionally distilled to recover substantially pure phthalic anhydride overhead. The portion of the vapor which is not condensed upon cooling to about 300° F. consists essentially of steam and some uncondensed phthalic anhydride and is desirably returned to the condensation zone.

Figure 3:
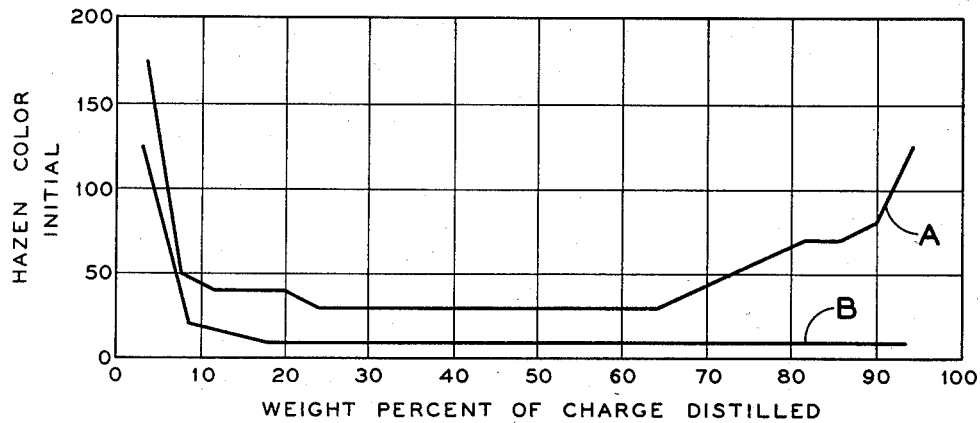
Figure 2:
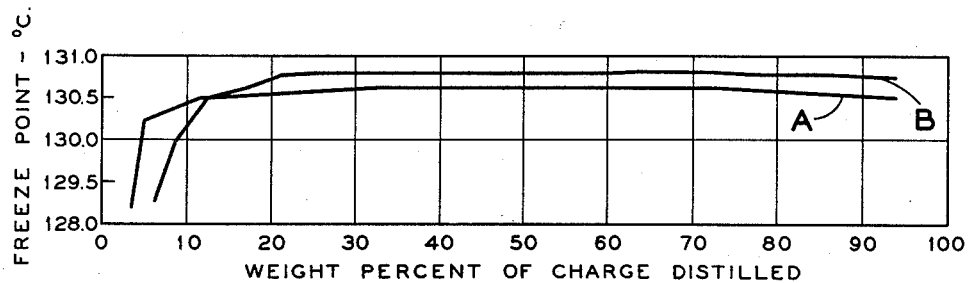
Figure 4:
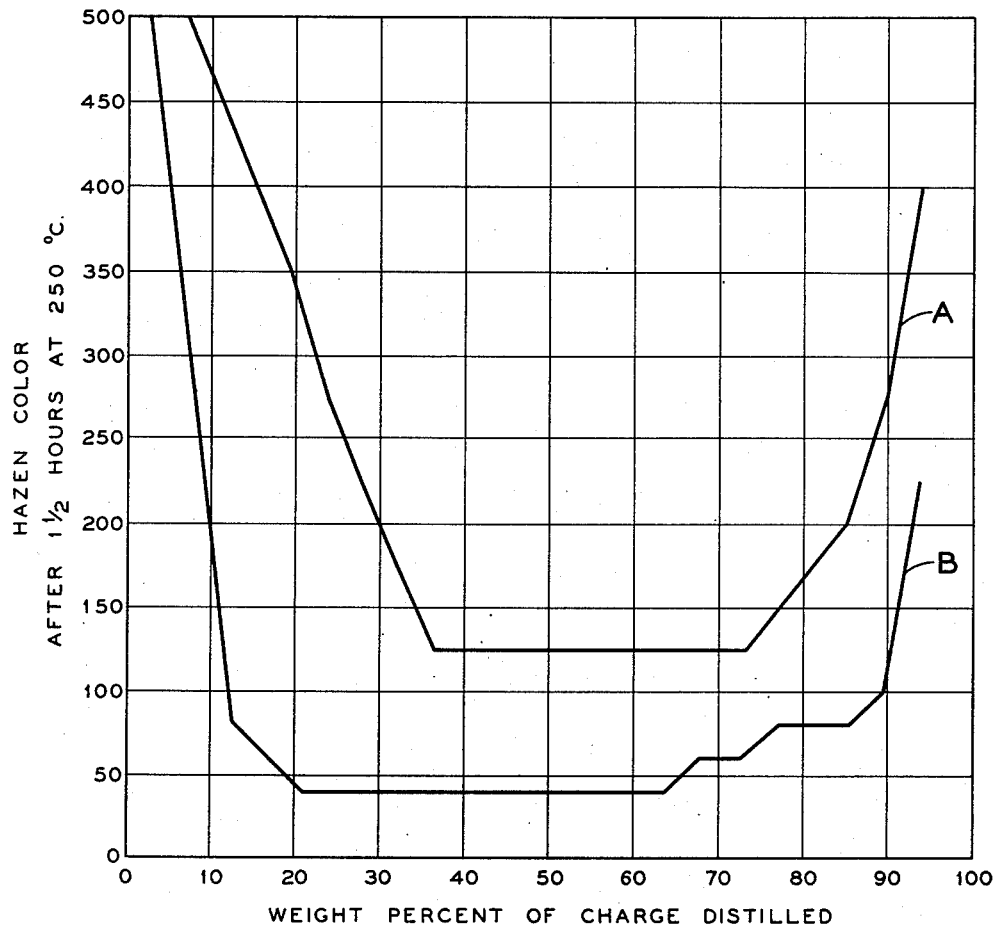

The invention may be better understood by reference to the appended drawings, of which Figure 1 is a diagrammatic illustration of apparatus and process flow suitable for the practice of the invention, and Figures 2, 3 and 4 are graphical representations of data showing comparative recoveries of specification phthalic anhydride when the purification is conducted in accordance with prior art practices and when it is conducted pursuant to the invention.

Referring now to Fig. 1, a mixture of a phthalic anhydride convertible hydrocarbon and air is passed through line 1 into converter 2 where it is contacted with a vanadium oxide catalyst at a temperature of about 1000° F. The oxidation reaction product comprising phthalic anhydride is withdrawn from converter 2 through line 3 and is passed into scrubber 4 through line 5. A substantial volume of water is maintained in scrubber 4 and the oxidation reaction product mixture is released in the scrubber at a point well below the surface of the water. The water cools the oxidation reaction product, causing condensation of phthalic anhydride and forming an aqueous slurry of phthalic acid in the bottom of the scrubber. The uncondensed portion of the oxidation reaction product is withdrawn from scrubber 4 through line 6 and is passed into cyclone 7 where any entrained solid and liquid materials are removed and returned to scrubber 4 through line 8. Fixed gases contained in the oxidation reaction product mixture are withdrawn from the system through line 9. A slurry of phthalic acid in water is withdrawn from scrubber 4 through line 10 and is pumped by pump 11 through line 12 to centrifuge 13. Centrifuge 13 is a centrifugal filter which separates solid phthalic acid as a filter cake. The filtrate from the slurry is withdrawn from centrifuge 13 through line 14 and is passed into storage tank 15. The filter cake is washed with water introduced through line 16. The washed filter cake is passed from centrifuge 13 usually by gravity of flow through line 17 to reslurry tank 18. Water is introduced into reslurry tank 18 through line 19 and the solid phthalic acid and water are mixed in tank 18 to form a pumpable slurry which is then pumped through line 20 into flash still 21. The temperature in flash still 21 is maintained in the range from 375° F. to 450° F., preferably in the range from 400° F. to 440° F. Steam and phthalic anhydride vapors are withdrawn from flash still 21 through line 22 and passed into partial condenser 23. In partial condenser 23 the vapors entering through line 22 are cooled to about 300° F. to cause condensation of liquid phthalic anhydride. While a temperature of about 300° F. is preferred, considerable variation in the temperature of operation of the partial condenser is possible. The gases entering the condenser should not be cooled below 250° F., and preferably not below 275° F., since the condensation of steam to liquid water should be avoided, and it is desired to minimize the phthalic acid content of the liquid phthalic anhydride condensate. Cooling to temperatures above 300° F., but sufficiently low to cause the condensation of liquid phthalic anhydride, may be resorted to, but as the temperature of operation of the partial condenser is raised above 300° F., the phthalic anhydride content of the uncondensed portion of the vapor is increased, resulting in an unnecessarily large recycle of uncondensed phthalic anhydride to scrubber 4. Liquid phthalic anhydride accumulates in the lower portion of condenser 23 and is withdrawn through line 24 and passed into high temperature digestion tank 25. The phthalic anhydride condensate ordinarily contains approximately 10% by weight of phthalic acid in solution in the phthalic anhydride. The uncondensed portion of the vapor stream charged to condenser 24 is withdrawn through line 39 and is passed through lines 40 and 41 into scrubber 4, being released in scrubber 4 below the surface of the water contained therein. As operation of flash still 21 is continued, relatively non-volatile side reaction products accumulate in it and are periodically withdrawn through line 26. Steam is introduced into flash still 21 through line 27 to facilitate phthalic anhydride removal. Sufficient steam is introduced to remove substantially all of the phthalic anhydride overhead. The amount of steam required depends upon the water content of the slurry introduced through line 20. High temperature digestion tanks 25, 28 and 29 are serially connected by lines 30 and 31. The three vessels are maintained at a temperature of about 450° F. and the residence time of phthalic anhydride in them ordinarily ranges from about 36 to about 100 hours. Tanks 25 and 28 are vented through lines 32 and 33, respectively, and the vented vapors are carried through line 34 and introduced into line 5. After high temperature digestion of phthalic anhydride in tanks 25, 28 and 29, the phthalic anhydride is withdrawn from tank 29 through line 35 and passed into still 36. Still 36 is a batch still; approximately 4% of the charge to still 36 is removed through line 37 as a heads cut which does not meet specification. After removal of the heads cut approximately 90% of the still charge is removed through line 37 as a specification heart cut of phthalic anhydride. Approximately 6% of the still charge is withdrawn through line 38 as a bottoms fraction.

The crude oxidation reaction product effluent from converter 2 contains in addition to phthalic anhydride a small proportion of maleic anhydride and a small proportion of heavy side reaction products. As operation of scrubber 4 is continued, maleic acid accumulates in the liquid phase of the slurry produced in scrubber 4 and this liquid phase may attain a maleic acid content of 20 to 25% by weight. The filter cake produced at centrifuge 13 ordinarily has an interstitial liquid content amounting to about 35% by weight. The water brought into contact with the filter cake through line 16 displaces the initial interstitial liquid which is characterized by a high maleic acid content to the extent that the washed cake ordinarily has a maleic acid content below about 4% by weight based on its phthalic anhydride content. The greater proportion of the maleic acid contained in the phthalic anhydride slurry charged to flash still 21 is recycled to scrubber 4 through lines 39, 40 and 41 together with the uncondensed steam. The liquid phthalic anhydride effluent from partial condenser 23 ordinarily has a maleic anhydride content not exceeding about 1%. A portion of the maleic anhydride at this stage of the process may have been isomerized to fumaric acid. Maleic and fumaric acids contained in the liquid phthalic anhydride are partially destroyed during the high temperature digestion in tanks 25, 28 and 29 and any residue of these materials is removed in the heads cut during distillation at still 36.

In representative commercial operation of the process of the invention 2350 pounds per hour of phthalic anhydride are separated at centrifuge 13, reslurried with approximately an equal weight of water in reslurry tank 18 and charged to flash still 21. Steam is introduced into still 21 through line 27. Approximately 2600 pounds per hour of phthalic anhydride are removed overhead from flash still 21 through line 22. Approximately 2250 pounds per hour of liquid phthalic anhydride are removed from partial condenser 23 through line 24, of which about 250 pounds per hour are returned to flash still 21 to maintain a body of liquid acting as a heat sink in that still. Approximately 2000 pounds per hour of digested phthalic anhydride are charged to still 36 through line 35 and approximately 1800 pounds per hour of specification phthalic anhydride are recovered at line 37. About 350 pounds per hour of phthalic anhydride are recycled from partial condenser 23 through line 40 to scrubber 4. The reslurried filter cake charged to flash still 21 has a maleic acid content of about 4% based on phthalic anhydride contained therein, while the liquid phthalic anhydride effluent from partial condenser 23 has a maleic anhydride content of about 1% by weight.

In Figures 2, 3 and 4 data illustrating comparative freeze points and color properties of phthalic anhydride produced pursuant to the prior art and pursuant to the invention are presented graphically. In these figures curves A show the properties of phthalic anhydride prepared by condensing phthalic anhydride in scrubber 4, filtering it at centrifuge 13, digesting the filter cake at 450° F. for 36 hours and then distilling the digested phthalic anhydride. Property inspections were made on segregated fractions of the overhead during the distillation. Curves B of Figures 2, 3 and 4 show the properties of phthalic anhydride produced pursuant to the invention. The condensate produced at partial condenser 23 was digested at 450° F. for 36 hours and then fractionally distilled.

In Fig. 2, weight percent of phthalic anhydride distillate is plotted against the freeze point of the distillate. Curves A and B show the freeze point variations of phthalic anhydride samples produced as described above. It will be noted that the freeze point of the phthalic anhydride produced pursuant to the invention is substantially higher than that produced following the prior art.

In Fig. 3, curves A and B show the initial Hazen colors of phthalic anhydride samples produced as indicated above. It will be noted that phthalic anhydride purified pursuant to the process of the invention is markedly superior in color.

In Fig. 4 of the appended drawings, curves A and B show comparative color stability of phthalic anhydride samples produced as indicated above. Both samples of phthalic anhydride were heated to 250° C., held at that temperature for 1½ hours, and Hazen colors of the distillation fractions were determined. It will be noted that phthalic anhydride produced pursuant to the invention is remarkably better than that produced according to the prior art.

From the data presented in Figures 2, 3 and 4, it is clear that the process of the invention results in the production of phthalic anhydride of substantially higher quality than that produced following prior art methods. It will be noted that by following the process of the invention, a substantially higher percentage of the total phthalic anhydride contained in the crude oxidation reaction product is recovered at purity such that specification freeze points and Hazen color values are met. While the manner in which the method of the present invention accomplishes this result cannot be stated with certainty, it appears probable that the flash distillation of the phthalic anhydride slurry accomplishes a separation of phthalic anhydride from side reaction products which is not accomplished in ordinary distillation, making it possible to charge a phthalic anhydride stock having a low content of side reaction products to the final distillation. It seems likely that the relative absence of side reaction products in the charge to the final distillation results in smaller losses due to interaction of phthalic anhydride with some or all of these side reaction products and reduces impurities in the phthalic anhydride overhead throughout the distillation.

We claim:

1. The method of purifying phthalic anhydride which comprises mixing sufficient water with the phthalic anhydride to form a pumpable slurry comprising the phthalic acid and water, heating the slurry in a distillation zone to a temperature sufficient to cause evaporation of water and phthalic anhydride, passing steam into the distillation zone, removing steam and phthalic anhydride vapor overhead from said distillation zone, cooling the overhead vapors to about 300° F. to produce a liquid condensate consisting predominantly of phthalic anhydride and free of water and fractionally distilling the condensate to recover purified phthalic anhydride overhead.

2. The method of purifying phthalic anhydride which comprises adding water to solid phthalic anhydride to produce a slurry containing about .5 to 3.0 parts by weight of water per part of phthalic acid, heating said slurry in a distillation zone to a temperature sufficient to cause evaporation of both water and phthalic anhydride, removing water and phthalic anhydride vapor overhead from said distillation zone, cooling the overhead vapors to about 300° F. to produce a liquid condensate consisting predominantly of phthalic anhydride and free of water and fractionally distilling the condensate to recover purified phthalic anhydride overhead.

3. The method of purifying crude phthalic anhydride which comprises adding water to solid phthalic anhydride to form a slurry containing about .5 to 3.0 parts by weight of water per part of phthalic acid, heating said slurry in a distillation zone to a temperature in the range from about 375° F. to 450° F., passing steam into the distillation zone, removing water and substantially all of the phthalic anhydride contained in the crude phthalic anhydride overhead from said distillation zone, cooling the overhead vapors to about 300° F. to produce a liquid condensate consisting predominantly of phthalic anhydride and free of water and fractionally distilling the condensate to recover purified phthalic anhydride overhead.

4. The method of purifying crude phthalic anhydride which comprises the addition of water to solid phthalic anhydride forming a slurry containing about .5 to 3.0 parts by weight of water per part of phthalic acid, subjecting said slurry to a temperature in the range from about 375° F. to 450° F. in a distillation zone, removing water and substantially all of the phthalic anhydride contained in the crude phthalic anhydride overhead from said distillation zone, cooling the overhead vapors to about 300° F. to produce a liquid condensate consisting predominantly of phthalic anhydride and free of water and a vapor phase consisting predominantly of water vapor and containing some phthalic anhydride vapor, and fractionally distilling said condensate to recover purified phthalic anhydride overhead.

5. In a process for producing phthalic anhydride by vapor phase oxidation of a phthalic anhydride convertible hydrocarbon with a stoichiometric excess of air, recovering crude phthalic anhydride from the reaction product gas and fractionally distilling the crude phthalic anhydride to produce specification phthalic anhydride, the improved method which comprises contacting the reaction product gas with water to produce a slurry of phthalic acid in water, filtering the slurry to recover phthalic acid as the filter cake, reslurrying the filter cake with at least sufficient water to form a pumpable slurry, rapidly heating the last-mentioned slurry to a temperature sufficient to cause evaporation of water and phthalic anhydride, passing steam into the hot slurry, withdrawing a vapor consisting essentially of steam and phthalic anhydride, cooling the vapor to about 300° F. to condense liquid phthalic anhydride therefrom, and fractionally distilling the condensed phthalic anhydride to recover substantially pure phthalic anhydride overhead.

6. In a process for producing phthalic anhydride by vapor phase oxidation of a phthalic anhydride convertible hydrocarbon with a stoichiometric excess of air, recovering crude phthalic anhydride from the reaction product gas and fractionally distilling the crude phthalic anhydride to produce specification phthalic anhydride, the improved method which comprises contacting the reaction product gas with water in a condensation zone to produce a slurry of phthalic acid in water, filtering the slurry to recover phthalic acid as the filter cake, reslurrying the filter cake with at least sufficient water to form a pumpable slurry, rapidly heating the last-mentioned slurry to a temperature in the range from about 375° F. to 450° F. to produce a vapor phase consisting essentially of steam and phthalic anhydride, cooling the vapor phase to about 300° F. to condense liquid phthalic anhydride therefrom, fractionally distilling the condensed phthalic anhydride to recover substantially pure phthalic anhydride overhead, and returning the uncondensed portion of the vapor phase to the condensation zone.

7. The process of recovering phthalic anhydride from a hot reaction product mixture produced by oxidizing a hydrocarbon with a stoichiometric excess of air which comprises introducing the mixture into a primary slurrying vessel containing water, introducing the mixture below the liquid level in said vessel so as to form a slurry, filtering said slurry and reslurrying the filter cake in a secondary slurry vessel by the addition of water so as to form a slurry of phthalic acid and water containing about .5 to 3.0 parts by weight of water per part of phthalic acid, passing said slurry to a flash distillation zone operating at a temperature in the range from about 400° F. to 440° F., removing water vapor and phthalic anhydride vapor overhead from the flash distillation zone, cooling said overhead vapors in a partial condenser to about 300° F. to produce a liquid condensate consisting predominantly of phthalic anhydride and free of liquid water and a vapor phase consisting predominantly of water vapor, recycling said vapor phase into the primary slurrying vessel, introducing said condensate into a digestion zone and there digesting it at 425° F. to 475° F. for a period in the range from 36 to about 100 hours, passing the digested condensate into a still and fractionally distilling the condensate to recover pure phthalic anhydride overhead.

References Cited in the file of this patent

UNITED STATES PATENTS

| | | |
|---|---|---|
| 2,071,329 | Brown | Feb. 23, 1937 |
| 2,071,361 | Rogers et al. | Feb. 23, 1937 |
| 2,670,355 | Barsky et al. | Feb. 23, 1954 |